United States Patent [19]

Rosi et al.

[11] Patent Number: 4,966,278

[45] Date of Patent: Oct. 30, 1990

[54] DISKETTE HOLDER

[76] Inventors: Ronald Rosi, 27 Skyline Dr., Billerica, Mass. 01821; Valerie C. Sullivan, 62 Ridge Rd., Lowell, Mass. 01852

[21] Appl. No.: 365,749

[22] Filed: Jun. 13, 1989

[51] Int. Cl.⁵ .......................................... B65D 85/57
[52] U.S. Cl. .................................... 206/444; 211/11; 211/40
[58] Field of Search ............... 206/307, 309, 425, 444; 211/10, 11, 40, 41, 59.2, 71, 126, 181

[56] References Cited

U.S. PATENT DOCUMENTS

| | | | |
|---|---|---|---|
| 2,564,244 | 8/1951 | Bibler | 206/425 |
| 3,114,459 | 12/1963 | Kersting | 211/40 |
| 3,446,360 | 5/1969 | Gutierrez | 211/40 |
| 4,212,401 | 7/1980 | Schweizer | 206/425 |
| 4,356,918 | 11/1982 | Kahle et al. | 206/444 |
| 4,369,879 | 1/1983 | Egly et al. | 206/444 |
| 4,519,893 | 5/1985 | Olas | 206/444 |

FOREIGN PATENT DOCUMENTS 2200895  8/1988  United Kingdom .............. 206/309

Primary Examiner—Jimmy G. Foster
Attorney, Agent, or Firm—Edward A. Gordon

[57] ABSTRACT

A interim holder of open framework construction for computer diskettes comprising a base portion including a rear member, a pair of forwardly extending side members, and end members which preferably extend downwardly from the respective forwardly extending side members to provide an inclination of the plane of the base member from the rear member to the forward end members. An upper rack portion is attached to the base portion and includes a pair of rearward elements which extend upwardly from the respective base side members with angular members having portions extending laterally, forwardly and inwardly from the respective rearward elements and forming an overall generally rectangular configuration in the horizontal plane, the angular members providing respectively rearward, lateral and forward support to diskettes in the holder. A pair of forward elements extend upwardly and forwardly from the respective base side members at a selected distance forward of the rearward elements and provide a limit to the forward movement of the base portions of diskettes in the holder and also the maximum number of diskettes placed in the holder. A diskette may be held or moved to a forward angle against the inward portion (forward support surface) of the angular members or a rearward angle against the lateral portions (rearward support surface) of the angular members and may be freely rotated therebetween as desired. The present invention also contemplates a closed framework construction as a further embodiment of the invention.

15 Claims, 4 Drawing Sheets

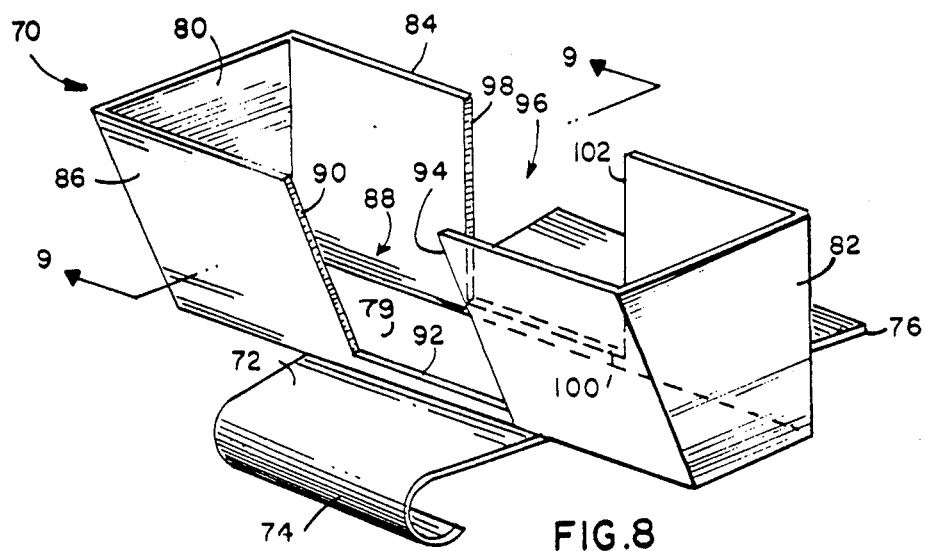
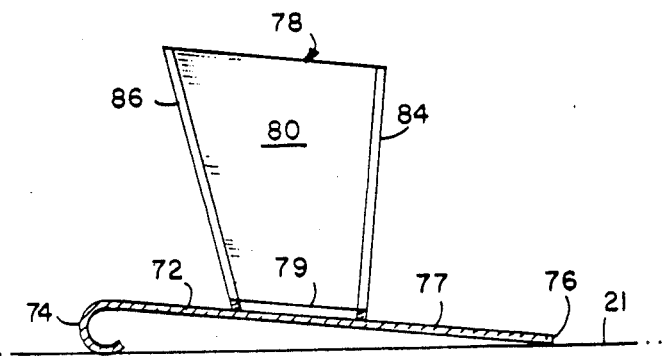

DISKETTE HOLDER

BACKGROUND OF THE INVENTION

1. Field of the Invention

The present invention relates generally to holders for computer diskettes and more particularly to an improved diskette holder which provides for a temporary or interim holder for a limited number of diskettes for simple handling as well as rapid and easy access.

2. Description of the Prior Art

Often a computer has fewer disk drives than the number of diskettes required for a particular job. Diskettes which are not in use at any particular moment for a particular job, for example, should be readily and conveniently accessible so that one diskette may be easily replaced by another in the computer whenever desired. Also, the envelope for any such diskette which is in a disk drive should be able to be stored in the holder so that it is also easily and conveniently accessible when the diskette is removed from the drive.

In the prior art relating to data diskette storage, designs for diskette holders were restricted by the fact that the conventional diskettes were flexible, and thus could not be supported in cantilever fashion along an edge or from a corner without the possibility of damaging the recording medium. With the advent of rigid-case diskettes, existing designs for diskette holders were adapted with apparently little thought being given to a simplified diskette holder which holds a number of diskettes for temporary or interim storage and display while providing protection and convenient insertion and removal.

Exemplary of the present state of the art are U.S. Pat. Nos. 4,600,110 and No. 4,629,067.

U.S. Pat. No. 4,600,110 discloses a temporary holder for computer diskettes and their envelopes in the form of a knockdown assembly having two rigid, upstanding, opposite end pieces, two bottom rails extending horizontally between the end pieces, and normally flat, thin, vinyl strips flexed into an inverted U-shape and held end-to-end by the bottom rails between the end pieces to provide successive slots in which diskettes or their envelopes can be inserted and resiliently held temporarily.

U.S. Pat. No. 4,629,067 discloses a holder for rigid-case diskettes, comprising a platform having a plurality of lateral grooves in the upper surface thereof for receiving diskettes. Diskette support means associated with each groove are attached to or integral with the platform and comprise a front support face angled upwardly and forwardly from the area of the groove and an opposing rear support face angled upwardly and rearwardly from the area of the groove.

While such prior art devices provide improvement in the area intended, such devices leave much to be desired in the area of providing a temporary diskette holder which is versatile in the type of diskettes held and which provides for convenient insertion and removal of diskettes.

Accordingly, a principal desirable object of the present invention is to provide a new and improved diskette holder which conveniently holds a number of diskettes for interim storage and display and which provides convenient removal and insertion of the diskettes.

Another desirable object of the present invention is to provide a holder for computer diskettes with the foregoing characteristics having an open framework construction.

A still further desirable object of the present invention is to achieve the above desirable objects with an essentially simple structure, lending itself to inexpensive mass-production.

These and other desirable objects of the invention will in part appear hereinafter and will in part become apparent after consideration of the specification with reference to the accompanying drawings and the claims.

SUMMARY OF THE INVENTION

In accordance with the present invention, there is provided an interim holder of open framework construction for computer diskettes comprising a base portion including a rear member, a pair of forwardly extending side members, and end members which preferably extend downwardly from the respective forwardly extending side members to provide an inclination of the plane of the base member from the rear member to the forward end members. An upper rack portion is attached to the base portion and includes forward and rearward pairs of upright elements. A pair of rearward elements extend upwardly from the respective base side members with angular members having portions extending laterally, forwardly and inwardly from the respective upright elements and forming an overall generally rectangular configuration in the horizontal plane, the angular members providing respectively rearward, lateral and forward support to diskettes in the holder. A pair of forward elements extend upwardly and forwardly from the respective base side members at a selected distance forward of the rearward members and provide a limit to the forward movement of the base portions of diskettes in the holder and also the maximum number of diskettes placed in the holder. In a preferred embodiment the forward members are connected at their upper portions by a horizontal transverse member. The arrangement and size of the forward elements and angular members provide support means for the diskettes whereby a diskette may be held or moved to a forward angle against the inward portion (forward support surface) of the angular members or a rearward angle against the lateral portions (rearward support surface) of the angular members and may be freely rotated therebetween as desired. The open framework construction is preferably formed of non-magnetic wire-like elements of uniform cross section. The present invention also contemplates a closed framework construction as a further embodiment of the invention.

BRIEF DESCRIPTION OF THE DRAWINGS

For a fuller understanding of the nature and desired objects of the present invention, reference should be made to the following detailed description taken in conjunction with the accompanying drawings wherein like reference characters denote corresponding parts throughout several views and wherein:

FIG. 8 is a perspective view of a third embodiment of a diskette holder embodying the principals of the present invention; and FIG. 9 is a cross sectional view taken along the line 9—9 of FIG. 8.

DETAILED DESCRIPTION OF THE PREFERRED EMBODIMENT(S)

Figure 1:
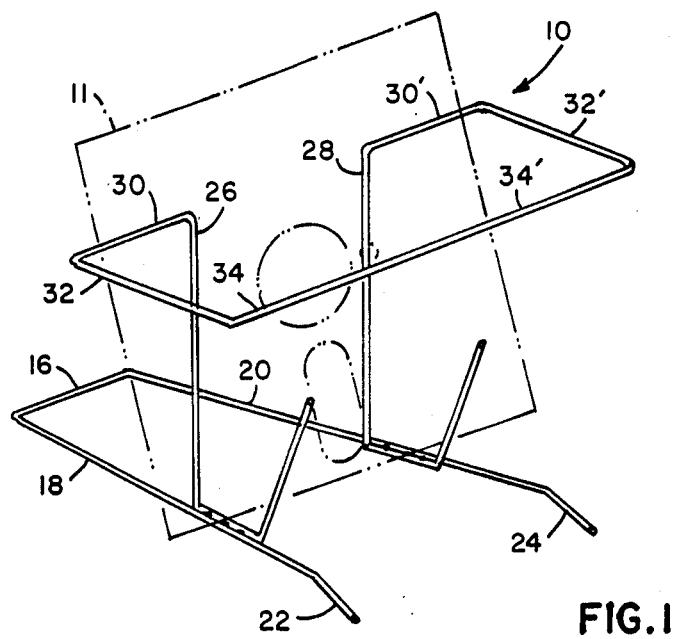
FIG. 1 is a perspective view illustrating a first embodiment of a diskette holder embodying the principals of the present invention.
Figure 1A:
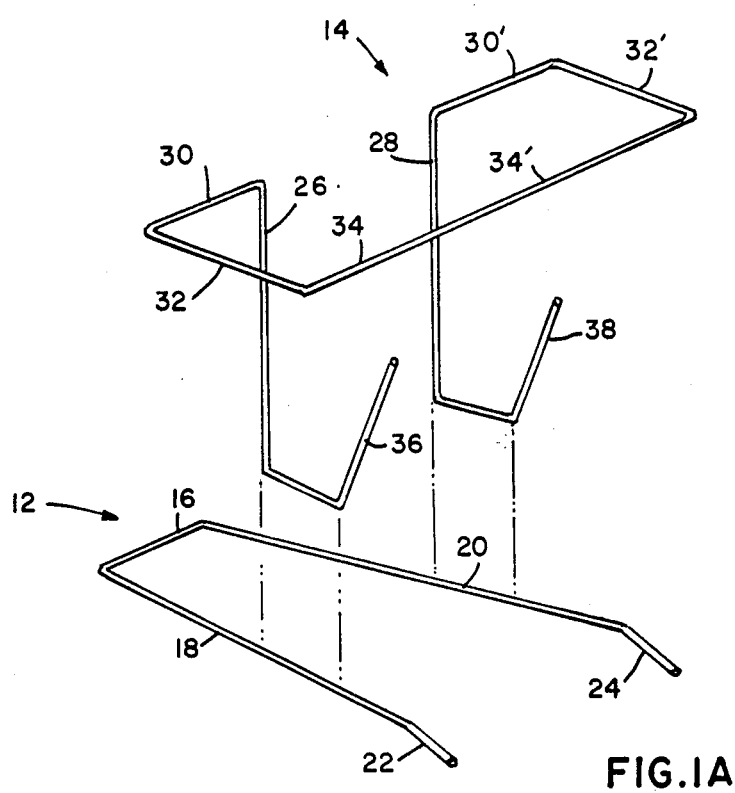
FIG 1A is an exploded view of the diskette holder of FIG. 1.
Figure 2:
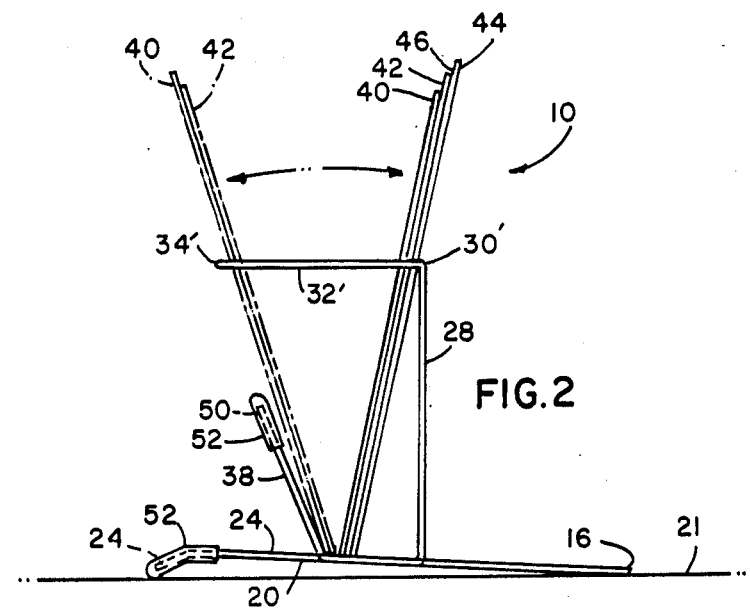
FIG. 2 is a side view of the diskette holder as seen from the left side of FIG. 1.
Figure 3:
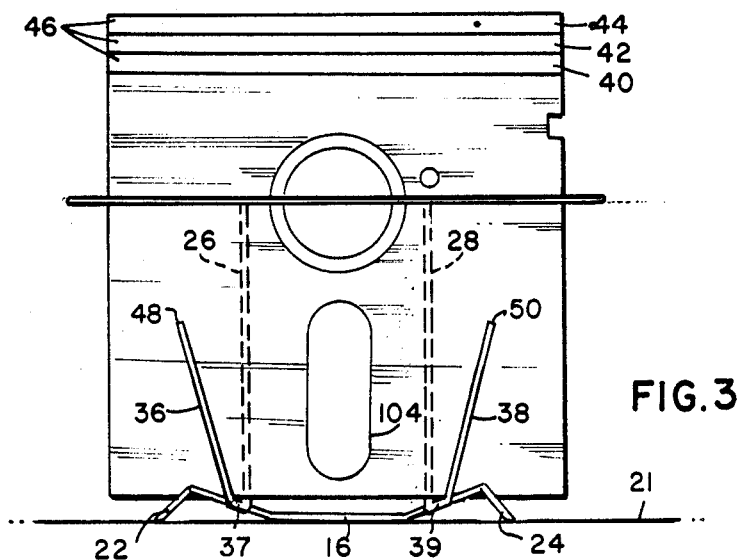
FIG. 3 is a front view of the diskette holder of FIG. 1.
Figure 4:
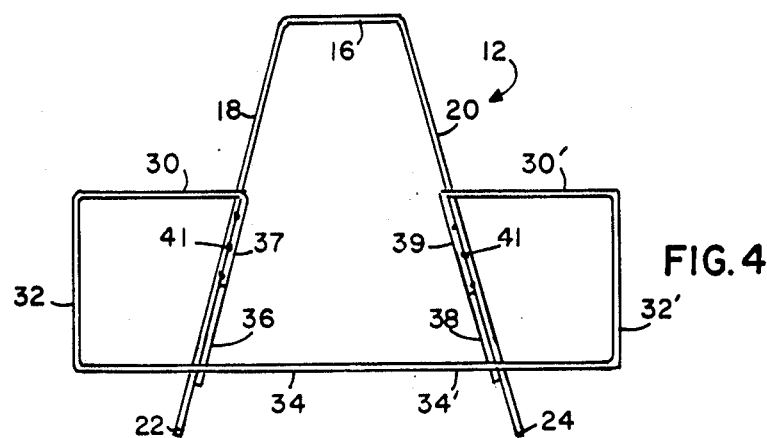
FIG. 4 is a top view of the diskette holder of FIG. 1.

Referring now to FIGS. 1-4 of the drawing, there is illustrated a first embodiment of a diskette holder embodying the principals of the present invention. The diskette holder, indicated generally by the numeral 10, for receiving one or more diskettes 11 (illustrated by the dotted line) is of open framework construction and is preferably made of relatively strong wire-like elements and may be formed, for example, from two single lengths of non-magnetic wire stock with one length forming the base portion 12 and the other length forming the upper rack portion 14 as can be seen more clearly in FIG. 1A. The base portion 12 comprises a rear member 16 and a pair of forwardly extending side members 18 and 20. In a preferred embodiment the side base members 18 and 20 taper from their forward ends to the rear member 16 to provide both lateral as well as longitudinal support stability. The side members preferably terminate with forward end members 22 and 24 which are angled downwardly from the plane of the side members to provide an inclination of the plane of base side members 18 and 12 from the rear member 16 to the forward ends of the base side members 18 and 20 when placed on a supporting surface 21 as shown in FIG. 2. In this manner the base member 12 can be formed from a single length of stock material. The rack portion of the holder comprises a pair of rearward upright elements 26 and 28 which extend upwardly from the respective base side members 18 and 20. The upright members 26 and 28 each have corresponding angular members having lateral or outward extending member portions 30 and 30', forward extending member portions 32 and 32' and inward extending member portions 34 and 34' which preferably form halves of the integral forward portion 34—34' of the rectangular configured support structure as described herein. The angular members form an overall generally rectangular configuration in the horizontal plane and is hereinafter in the specification and claims sometimes referred to as the rectangular support structure. In the preferred embodiment the rectangular configuration of the support structure has a greater width (i.e. transverse to the base) than length as best seen in FIG. 4. The lateral members 30 and 30' provide rearward support, the forward members 32 and 32' provide lateral support and the inward members 34 and 34' provide forward support to diskettes in the holders. A pair of forward members 36 and 38 which extend upwardly and forwardly from the respective base side members 18 and 20 at a selected distance along the base side members and forward of the rearward upright members 26 and 28 are provided which serve to limit the forward movement of the base of the diskettes in the holder and also the maximum number of diskettes placed in the holder.

As best seen in FIGS. IA and 4, the rearward members 26 and 28 and forward members 36 and 38 are respectively connected by integral intermediate members 37 and 39 which are preferably attached to the inner sides of the respective base side members 18 and 20. The intermediate members 37 and 39 can be attached by any suitable conventional means such as solder or spot welds 41, or adhesives. In this manner the upper rack portion 14 can be formed from a single length of stock material.

Referring now more particularly to FIGS. 2 and 3, diskettes, such as, 40, 42 and 44 when initially placed in the holder 10 can be supported against the lateral rearward members 30 and 30' at a rearward angle for display and initial or normal interim storage of the diskettes. The length of the intermediate base members 37 and 39 or the distance between the base of the rearward members 26 and 28 and the respective forward members 36 and 38 is sufficient so that diskettes when positioned in the rearward angular position are at a sufficient relative angular position so that identification means such as information strips 46 on the top of each diskette is visible as best seen in FIG. 3. The holder also permits the diskettes to be supported against the inward support members 34 and 34' which provide a forward angular support position for diskettes which are returned to the holder after use (such as diskette 40) as well as for diskettes which are flipped forward during selection of the diskettes (such as diskette 42). Accordingly, the diskettes are free to be rotated between the forward and rearward angular positions as desired while being supported on the base portion of the holder.

For simplicity of illustration the drawing shows only one diskette in FIG. 1 and three diskettes in FIGS. 2 and 3, however, it is to be understood that a much larger number of diskettes can be used. Also as used herein the term "forward angle" or "forward angular support" also relates to the usual position of the user with respect to the diskette holder. Also the height of the rectangular support structure section of the rack portion 14 above the base portion 12 is equal to about ½ to ⅔ the height of the diskettes to provide convenient and easy access to the diskettes as well as to insure retaining of the diskettes during rotation of the diskettes between the forward and rearward angular positions. Also, in a preferred embodiment, the forward end members 22 and 24 as well as the terminal ends 48 and 50 of the forward upright members can be covered or coated with a plastic or elastomeric material 51 to provide a smooth nonmarring surface as illustrated in FIG. 2.

Figure 5:
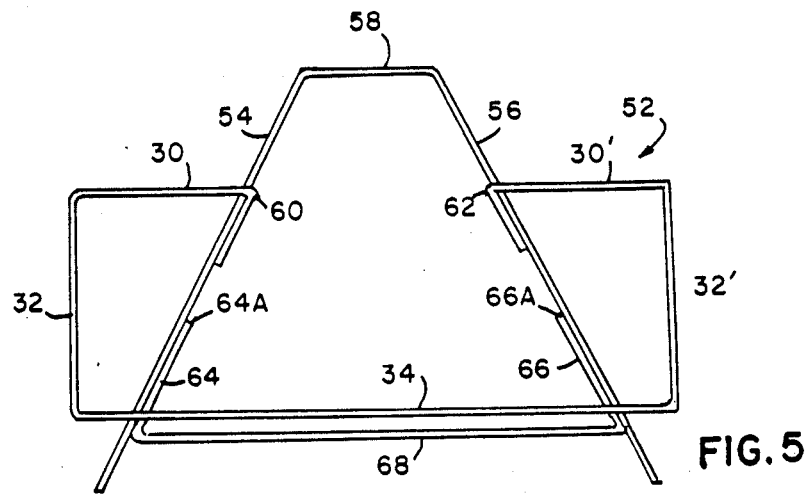
FIG. 5 is a top view of a second embodiment of the diskette holder in accordance with the present invention.
Figure 6:
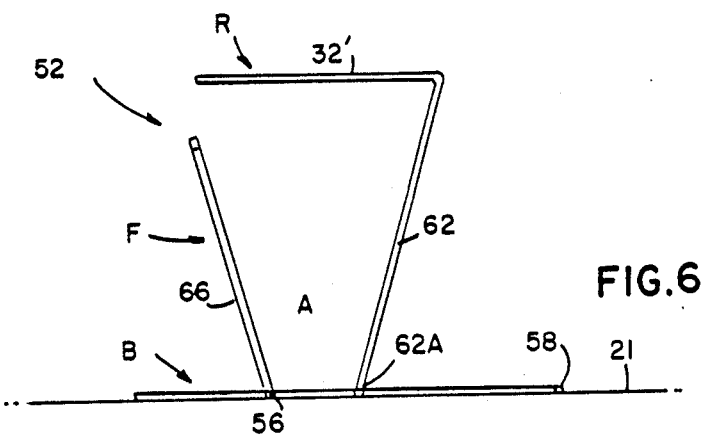
FIG. 6 is a side view of the diskette holder as seen from the left side of FIG. 5.
Figure 7:
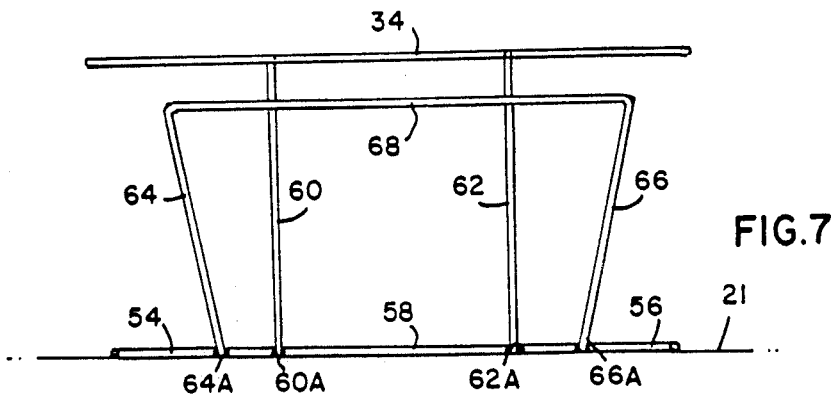
FIG. 7 is a front view of the diskette holder of FIG. 5.

Referring now to FIGS. 5-7 of the drawing, there is shown a second embodiment of the diskette holder in accordance with the present invention. As illustrated the diskette holder indicated generally by the numeral 5 is similar to diskette holder 10 except for the following changes. The base portion comprises base side members 54 and 56 which are connected by transverse end member 58. The rearward upright members 60 and 62 are attached at their lower ends 60A and 62A to the respective base members 54 and 56. The base side members 54 and 56 are not provided with angular front ends but rather form a straight horizontal line. In place of the angular front ends, the rearward upright members 60 and 62 are angularly positioned outward and rearward with respect to the base members 54 and 56 so that the forward angle between the respective base side members and rearward upright members shown as angle A of FIG. 6 is greater than 90° or obtuse to provide the rearward angular support for display in storage of the diskettes. The rectangular configured structure formed by rearward members 30 and 30', side members 32 and 32' and forward member 34 is similar to that of diskette holder 10. The forward upright members 64 and 66 extend angularly outward and forward and are attached at their lower ends 64A and 66A to the respective base members 54 and 56. Additionally the upright members 64 and 66 are joined by a transverse member 68. It can be appreciated that the base member B, rack member R, and forward member F as best seen in FIG. 6 can each be formed of an integral length of wire-like material to provide an inexpensive and convenient interim holder for floppy or hard diskettes.

Referring now to FIGS. 8 and 9, there is shown a third embodiment of the diskette holder of the present invention. The diskette holder 70 comprises an elongated base portion 72 which preferably has a downwardly curved forward portion 74 to provide an inclination of the holder 70 from the rear portion 76 to forward portion 74. Attached to the top surface 77 of the base member 76 is a closed framework container 78 having a bottom wall support member 79 having a transverse width greater than the length thereof, a forward support wall 86 secured to and adapted to extend angularly outward from the front portion of the bottom wall 79, a rearward support wall 84 secured to and adapted to extend angularly outward from the rear portion of the bottom wall 79, and a pair of end or side walls 80 and 82 secured to and adapted to extend vertically from each side portion of the bottom wall 79, each being joined to the adjacent forward and rearward support walls 86 and 84. The forward support wall 86 provides a front support at a forward angle when diskettes are flipped forward for selection. Similarly, the rearward support wall 84 provides a rear support at a rearward angle for display and normal storage of the diskettes in the same manner as illustrated in FIG. 2. The side members 80 and 82, forward member 80, and rear member 84 together form a container having a rectangular configuration wherein the width is greater than the length. The forward support member 86 is provided with an opening or aperture 88 disposed in the center of the forward member and defined by the surfaces 90, 92 and 94 of the forward support member 86. The rearward support member 84 is also provided with a corresponding opening or aperture 96 defined by the surfaces 98, 100 and 102 of the rearward support member 84. The angular positions of the forward and rearward support members 86 and 84 provide for the forward and rearward angular support positions of the diskettes in the same manner as the first embodiment of the holder shown in FIGS. 1–4. The openings 88 and 96 permit the diskettes of the type 40 of FIG. 3, for example, to be positioned in the forward angular position or rearward angular position as shown in FIG. 2 without the possibility of damaging contact of the support members 84 and 86 with the diskette through the access opening 104 in the diskette envelope 105 as shown in FIG. 3. The open framework construction of the first and second embodiments described herein also provide such a safety feature. It is to be understood that when rigid-case diskettes are used the rigid character of the protective case permits the container 78 to be formed without the apertures. The diskette holder 70 can be made of a suitable non-magnetic material such as plastics, wood and the like, plastic being preferable.

Furthermore, it should be apparent that the configuration of the base portion of the holder can be varied such as, for example, a C-shaped or U-shaped configuration although the tapered configuration provides for a simple but stable support for the diskette holder.

It is believed to be readily apparent from the foregoing that the diskette holder of the present invention can be easily formed to provide an inexpensive and convenient interim holder for floppy or hard diskettes with or without envelopes which pertain to the same topic and which an operator of a computer may want to keep near each other for ready access.

While the invention has been described with respect to preferred embodiments, it will be apparent to those skilled in the art that changes and modifications may be made without departing from the scope of the invention herein involved in its broader aspects. Accordingly, it is intended that all matter contained in the above description, or shown in the accompanying drawing shall be interpreted as illustrative and not in limiting sense.

What is claimed is:

1. A diskette holder comprising:
   a base portion including a pair of spaced elongated side members each having front and rear end portions and a transverse member joining said rear end portions;
   a rack portion including a pair of parallel rearward members extending upwardly from the respective base side members;
   angular members extending outwardly, forwardly and inwardly relative to and from the respective rearward members; said angular members forming an overall generally rectangular support structure in the horizontal plane, said rectangular support structure providing respectively rearward, lateral and forward support means to diskettes in the holder; and
   a pair of forward members extending upwardly and forwardly from the respective base side members at a selected distance forward of the rearward members;
   said forward members adapted to limit the forward movement of the base portions of diskettes in the holder.

2. The diskette holder according to claim 1 wherein the front end portions of the base side members are angled downwardly from the horizontal.

3. The diskette holder according to claim 2 wherein said front end portions are covered with a non-marring material.

4. The diskette holder according to claim 1 wherein said forward members are joined by a transverse connecting member.

5. The diskette holder according to claim 1 wherein said base side members form a tapered spaced relationship from the front end portions to the rear end portions.

6. The diskette holder according to claim 1 wherein the base portion comprises a unitary element formed of a wire-like material.

7. The diskette holder according to claim 1 wherein the rack portion comprises a unitary element formed of a wire-like material.

8. The diskette holder of claim 1 wherein the forward support means and rearward support means of the rectangular support structure are positioned with respect to the portion of the base side members extending between the rearward and forward members whereby diskettes placed within the holder may be flipped forward against the forward support means at a forward angle for selection and against the rearward support means at a rearward angle for display and normal holding of the diskettes.

9. A diskette holder comprising:
   a base portion including a pair of spaced elongated side members each having front and rear end portions and a transverse member joining said rear end portions;
   a rack portion including a pair of parallel rearward members extending upwardly from the respective base side members;
   angular members extending outwardly and forwardly from the respective rearward members;
   a first transverse member connecting said forward angular members;
   said outwardly extending angular members and transverse member providing respectively rearward and forward support means to diskettes in the holder;
   a pair of forward members extending upwardly and angled forwardly from the respective base side members at a selected distance forward of the rearward members;
   said forward members adapted to limit the forward movement of the base portions of diskettes in the holder; and
   a second transverse member connecting said forward members.

10. The diskette holder according to claim 9 wherein said rearward members are slanted rearwardly at a sufficient angle whereby the information strip on top of each diskette is visible when diskettes are supported by the rearward support means.

11. The diskette holder according to claim 9 wherein the height of the rearward and forward support means is about $\frac{1}{2}$ to $\frac{2}{3}$ the height of a diskette.

12. A diskette holder for flexible diskettes having envelopes with access openings comprising:
    an elongated base member having a front end and a rear end; said front end having a downwardly extending portion whereby the elongated base member is inclined upwardly from the rear end to front end;
    a container for supporting diskettes;
    said container having a rectangular bottom wall fixedly attached to said base member, said bottom wall having a width greater than the length thereof;
    a forward support wall secured to and adapted to extend angularly outward from the front portion of said bottom wall;
    a rearward support wall secured to and adapted to extend angularly outward from the rear portion of said bottom wall;
    said forward and rearward support walls having corresponding apertures each disposed in the centers of the forward and rearward walls and extending downwardly from the top surfaces thereof whereby contact of the forward and rearward walls with the access opening of the diskette envelope maybe prevented; and
    a pair of end walls secured to and adapted to extend vertically from each side portion of said bottom wall, each being joined to the adjacent forward and rearward support walls;
    said forward support wall providing a front support at a forward angle when diskettes are flipped forward for selection, and said rearward support wall providing a rear support at a rearward angle for display and normal storage of the diskettes.

13. The diskette holder according to claim 12 wherein at least the container walls are formed of a plastic material.

14. A diskette holder comprising:
    an elongated base member having a front end and a rear end;
    a container for supporting diskettes;
    said container having a rectangular bottom wall attached to said base member, said bottom wall having a width greater than the length thereof;
    a forward support wall secured to and adapted to extend angularly outward from the front portion of said bottom wall;
    a rearward support wall secured to and adapted to extend angularly outward from the rear portion of said bottom wall; and
    a pair of end walls secured to and adapted to extend vertically from each side portion of said bottom wall, each being joined to the adjacent forward and rearward support walls;
    said forward support wall providing a front support at a forward angle when diskettes are flipped forward for selection, and said rearward support wall providing a rear support at a rearward angle for display and normal storage of the diskettes;
    said forward and rearward support walls having corresponding apertures disposed in the center portions thereof, whereby the access openings of diskettes placed against the forward and rearward support walls coincide with the respective apertures.

15. The diskette holder according to claim 14 wherein the base member is inclined from the rear end to the front end.

* * * * *